United States Patent
Annapureddy

(10) Patent No.: US 9,786,036 B2
(45) Date of Patent: Oct. 10, 2017

(54) REDUCING IMAGE RESOLUTION IN DEEP CONVOLUTIONAL NETWORKS

(71) Applicant: QUALCOMM Incorporated, San Diego, CA (US)

(72) Inventor: Venkata Sreekanta Reddy Annapureddy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 81 days.

(21) Appl. No.: 14/859,095

(22) Filed: Sep. 18, 2015

(65) Prior Publication Data

US 2016/0321784 A1    Nov. 3, 2016

Related U.S. Application Data

(60) Provisional application No. 62/154,084, filed on Apr. 28, 2015.

(51) Int. Cl.
| | |
|---|---|
| G06T 3/40 | (2006.01) |
| G06N 3/08 | (2006.01) |
| G06K 9/66 | (2006.01) |
| G06K 9/46 | (2006.01) |
| G06K 9/62 | (2006.01) |

(52) U.S. Cl.
CPC .......... G06T 3/4046 (2013.01); G06K 9/4623 (2013.01); G06K 9/627 (2013.01); G06K 9/66 (2013.01); G06N 3/082 (2013.01)

(58) Field of Classification Search
CPC  G06K 9/66; G06K 9/80; G06N 3/082; G06N 3/02; G06N 3/084; G06T 3/4046
USPC .................................................. 382/155–159
See application file for complete search history.

(56) References Cited

U.S. PATENT DOCUMENTS

| | | | |
|---|---|---|---|
| 7,454,079 B2 * | 11/2008 | Shinbata | G06K 9/40 358/463 |
| 7,835,549 B2 | 11/2010 | Kitamura et al. | |
| 8,861,842 B2 | 10/2014 | Jung et al. | |
| 8,873,813 B2 | 10/2014 | Tadayon et al. | |
| 8,957,988 B2 * | 2/2015 | Wexler et al. | H04N 5/23222 348/231.6 |
| 2013/0308860 A1 | 11/2013 | Mainali et al. | |
| 2015/0117760 A1 | 4/2015 | Wang et al. | |

OTHER PUBLICATIONS

Rementeria, et al. (A heuristic approach to structural and parametric change in artificial neural network), pp. 556-563, ieee, 1997.*
Brosch, et al. (Efficient Training of Convolutional Deep Belief Networks in the Frequency Domain for Application to High-Resolution 2D and 3D Images), pp. 211-227, MIT, 2014.*

(Continued)

*Primary Examiner* — Daniel Mariam
(74) *Attorney, Agent, or Firm* — Seyfarth Shaw LLP

(57) ABSTRACT

A method of reducing image resolution in a deep convolutional network (DCN) includes dynamically selecting a reduction factor to be applied to an input image. The reduction factor can be selected at each layer of the DCN. The method also includes adjusting the DCN based on the reduction factor selected for each layer.

36 Claims, 13 Drawing Sheets

(56) References Cited

OTHER PUBLICATIONS

Bengio Y., et al., "Practical Reconmendations for Gradient-Based Training of Deep Architectures", Jan. 1, 1901 (Jan. 1, 1901). Correct System Design; [Lecture Notes in Computer Science; Lect.Notes Computer]. Springer International Publishing, Cham, pp. 437-478, XP047292594, ISSN: 0302-9743 ISBN: 978-3-642-36616-1 paragraph [19.1.1]—paragraph [19.1.1] paragraph [19.3]—paragraph [19.5.1].

Bergstra J.S., et al., "Making a Science of Model Search: Hyperparameter Optimization in Hundreds of Dimensions for Vision Architectures," JMLR Workshop and Conference Proceedings, Feb. 15, 2013, vol. 28 (1), pp. 115-123, XP055253677, ISSN: 1938-7228, Sections 2-5.

Chen L-C., et al., "Semantic Image Segmentation With Deep Con-Volutional Nets and Fully Connected CRFS", CORR (ARXIV), vol. abs/1412.7062v3, Apr. 9, 2015 (Apr. 9, 2015), pp. 1-14, XP055293318, the whole document.

International Search Report and Written Opinion—PCT/US2016/028493—ISA/EPO—dated Aug. 19, 2016.

Karpathy A: "Convolutional Neural Networks for Visual Recognition", Apr. 19, 2015 (Apr. 19, 2015), pp. 1-15, XP055293763, Retrieved from the Internet: URL: https://web.archive.org/web/20150419085557/http://cs231n.github.io/convolutional-networks [retrieved on Aug. 5, 2016] the whole document.

Long J., et al., "Fully Convolutional Networks for Semantic Segmentation", 2015 IEEE Conference on Computer Vision and Pattern Recognition (CVPR), vol. abs/1411.4038v2, Mar. 8, 2015 (Mar. 8, 2015), pp. 1-10, XP055294644, ISBN: 978-1-4673-6964-0 the whole document.

Rippel O., et al., "Spectral Representations for Convolutional Neural Networks", CORR (ARXIV), vol. abs/1506.03767v1, Jun. 11, 2015 (Jun. 11, 2015), pp. 1-10, XP055294145, the whole document.

Szegedy C., et al., "Going Deeper with Convolutions", Sep. 17, 2014 (Sep. 17, 2014), pp. 1-12, XP055230968, Retrieved from the Internet: URL: http://arxiv.org/pdf/1409.4842v1.pdf [retrieved on Nov. 24, 2015] the whole document.

\* cited by examiner

REDUCING IMAGE RESOLUTION IN DEEP CONVOLUTIONAL NETWORKS

CROSS REFERENCE TO RELATED APPLICATION

This application claims the benefit under 35 U.S.C. §119(e) to U.S. Provisional Patent Application No. 62/154,084, entitled "REDUCING IMAGE RESOLUTION IN DEEP CONVOLUTIONAL NETWORKS," filed on Apr. 28, 2015, the disclosure of which is expressly incorporated herein by reference in its entirety.

BACKGROUND

Field

Certain aspects of the present disclosure generally relate to neural systems engineering and, more particularly, to systems and methods for reducing image resolution in deep convolutional networks while maintaining performance.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect of the present disclosure, a method of reducing image resolution in a deep convolutional network (DCN) is disclosed. The method includes dynamically selecting a reduction factor to be applied, to an input image, at each layer of the DCN. The method also includes adjusting the DCN based on the reduction factor selected for each layer.

Another aspect of the present disclosure is directed to an apparatus including means for dynamically selecting a reduction factor to be applied, to an input image, at each layer of the DCN. The apparatus also includes means for adjusting the DCN based on the reduction factor selected for each layer.

In another aspect of the present disclosure, a non-transitory computer-readable medium with non-transitory program code recorded thereon is disclosed. The program code for reducing image resolution in a DCN is executed by a processor and includes program code to dynamically select a reduction factor to be applied, to an input image, at each layer of the DCN. The program code also includes program code to adjust the DCN based on the reduction factor selected for each layer.

Another aspect of the present disclosure is directed to an apparatus for reducing image resolution in a DCN, the apparatus having a memory and one or more processors coupled to the memory. The processor(s) is configured to dynamically select a reduction factor to be applied, to an input image, at each layer of the DCN. The processor(s) is also configured to adjust the DCN based on the reduction factor selected for each layer.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
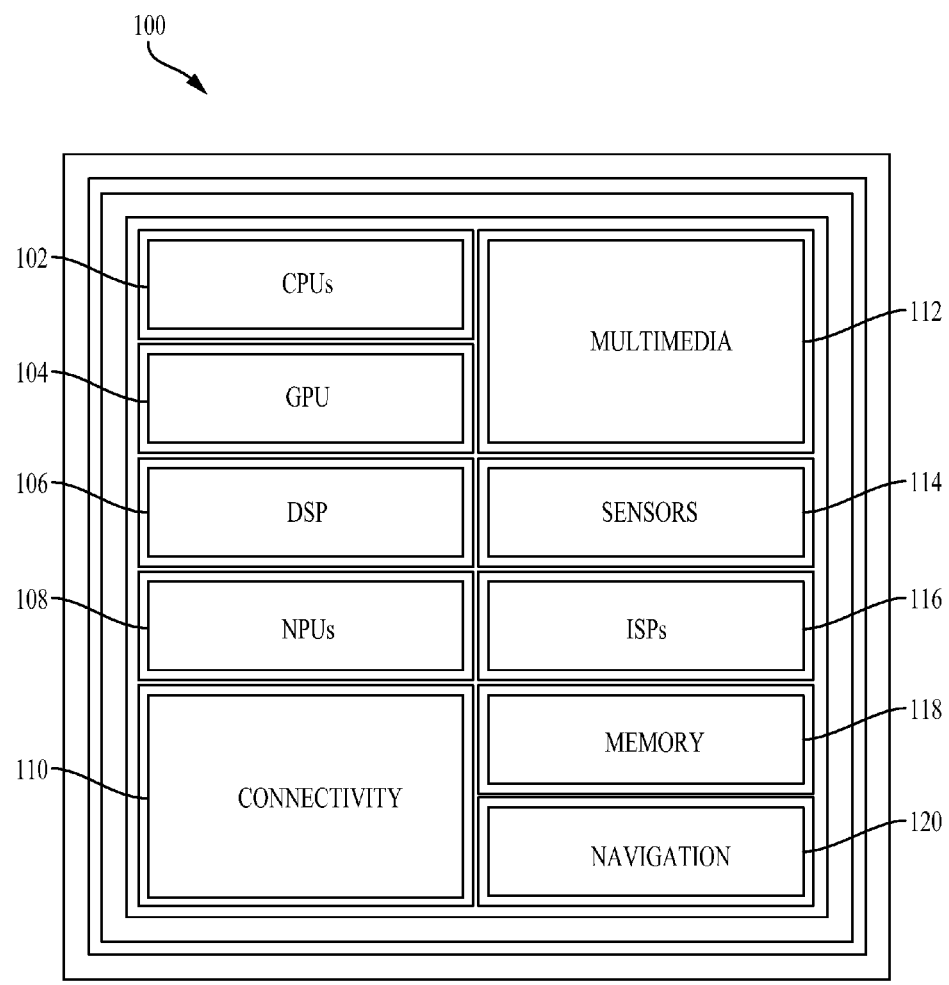
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Model Compression and Fine-Tuning

Deep neural networks, such as deep convolutional networks (DCNs), are used in several artificial intelligence tasks such as image/video classification, speech recognition, and/or face recognition. In conventional systems, neural network models are trained from a large database of training examples. Furthermore, in most cases, larger neural network models achieve better performance in comparison to smaller neural network models. For the purpose of deploying neural network models on some devices, such as mobile devices, cloud applications, robots, and/or cars, it is desirable to reduce the computational complexity, memory footprint, and/or power consumption.

Convolutional neural network models may be divided into a sequence of layers. Each layer may transform an input received from one or more preceding layers in the network and may produce an output for subsequent layers of the network. For example, a convolutional neural network may include fully-connected (FC) layers, convolutional layers, locally-connected (LC) layers, and other layers. Each of the different layers may perform a different type of transformation.

Furthermore, each of the layers receives, as an input, activation vectors from one or more previous layers, applies a linear/nonlinear transformation on the combined input vector, and outputs an activation vector to be used by one or more subsequent layers. Some layers are parameterized with weights, whereas some layers are not.

For image classification and/or facial recognition, an image resolution is specified for the input image. Furthermore, different image resolutions may be specified for various layers within the DCN. In conventional systems, the image resolutions specified for the DCN at the various layers are selected in an ad-hoc fashion. That is, in conventional systems, the trade-off between classification performance and computational complexity may not be considered or is not understood. Therefore, conventional systems may not have a systematic approach to selecting the image resolution at various layers.

Nonetheless, the selected image resolution may affect the performance, such as the computational complexity, of a DCN. As an example, decreasing an image resolution, at a layer, by a factor of two may decrease the computational complexity, at the layer, by a factor of four.

Aspects of the present disclosure are directed to reducing the resolution, such as an image resolution, of an input at the weight layers, such as fully-connected layers, convolutional layers, and locally-connected layers. The example layers perform a linear transformation, but differ in how the output neurons are connected to input neurons.

FIG. 1 illustrates an example implementation of the aforementioned reducing image resolution in a deep convolutional network using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system. The SOC may be based on an ARM instruction set.

In an aspect of the present disclosure, the instructions loaded into the general-purpose processor 102 may comprise code for dynamically selecting a reduction factor to be applied to an input image at each layer of the DCN. The instructions loaded into the general-purpose processor 102 may also comprise code for adjusting the DCN based on the reduction factor selected for each layer.

Figure 2:
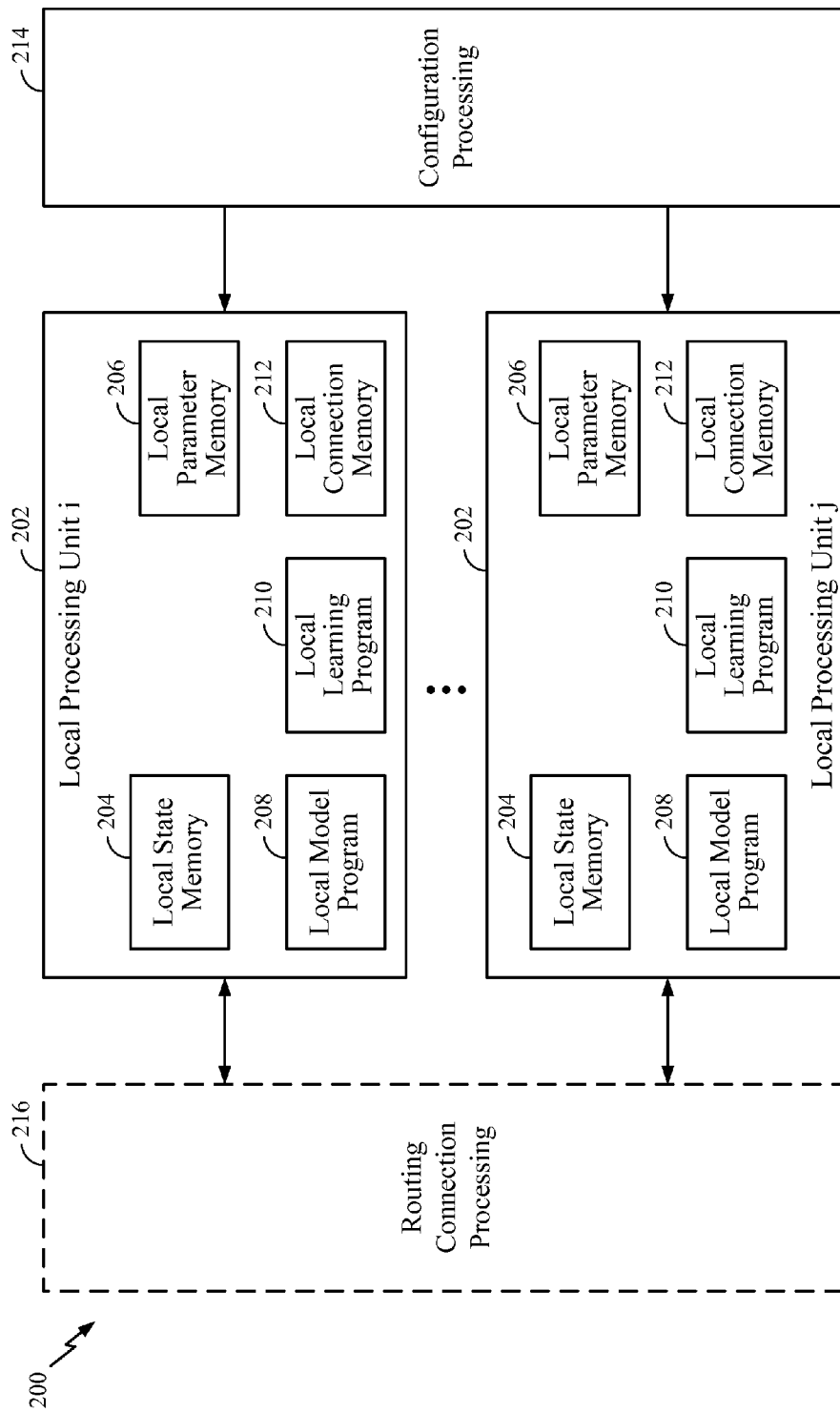
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that unfold in time. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
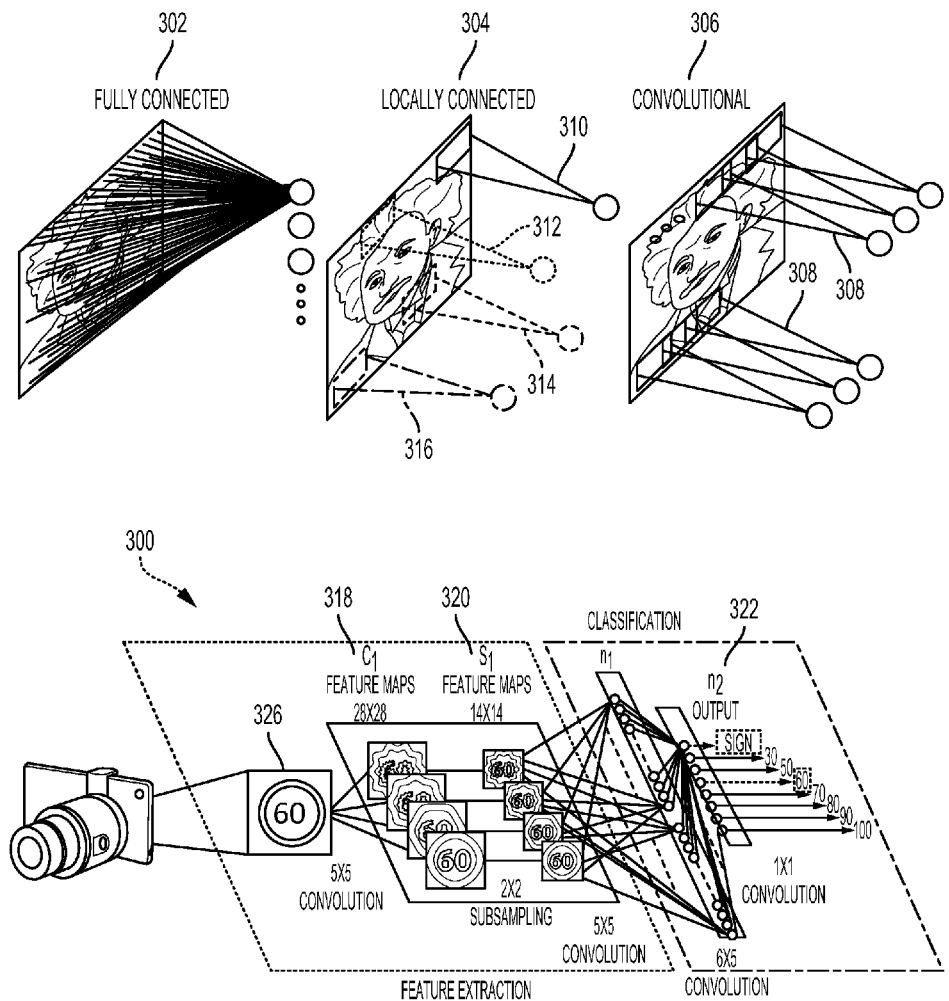
FIG. 3A is a diagram illustrating a neural network in accordance with aspects of the present disclosure.

Referring to FIG. 3A, the connections between layers of a neural network may be fully-connected 302 or locally-connected 304. In a fully-connected network 302, a neuron in a given layer may communicate its output to every neuron in the next layer. Alternatively, in a locally-connected network 304, a neuron in a given layer may be connected to a limited number of neurons in the next layer. A convolutional network 306 may be locally-connected, and is furthermore a special case in which the connection strengths associated with each neuron in a given layer are shared (e.g., 308). More generally, a locally-connected layer of a network may be configured so that each neuron in a layer will have the same or a similar connectivity pattern, but with connections strengths that may have different values (e.g., 310, 312, 314, and 316). The locally-connected connectivity pattern may give rise to spatially distinct receptive fields in a higher layer, because the higher layer neurons in a given region may receive inputs that are tuned through training to the properties of a restricted portion of the total input to the network.

Locally-connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image 326, such as a cropped image of a speed limit sign, and a "forward pass" may then be computed to produce an output 328. The output 328 may be a vector of values corresponding to features such as "sign," "60," and "100." The network designer may want the DCN to output a high score for some of the neurons in the output feature vector, for example the ones corresponding to "sign" and "60" as shown in the output 328 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To properly adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 328 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318, 320, and 322, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled 324, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
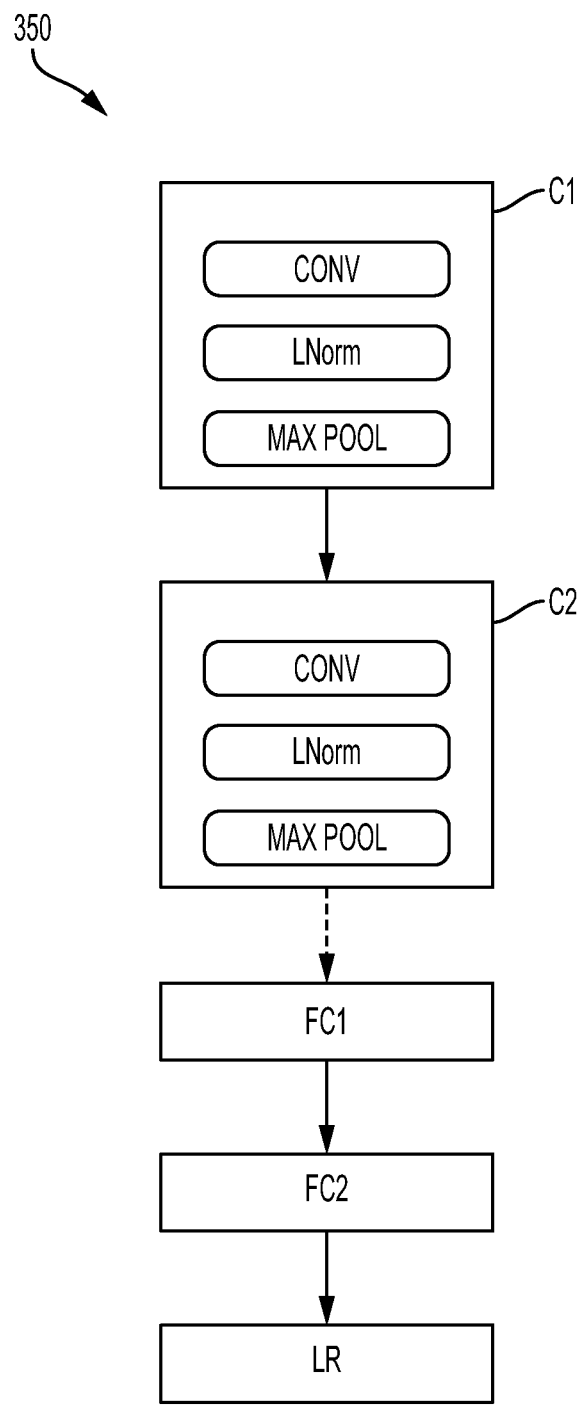
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully-connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
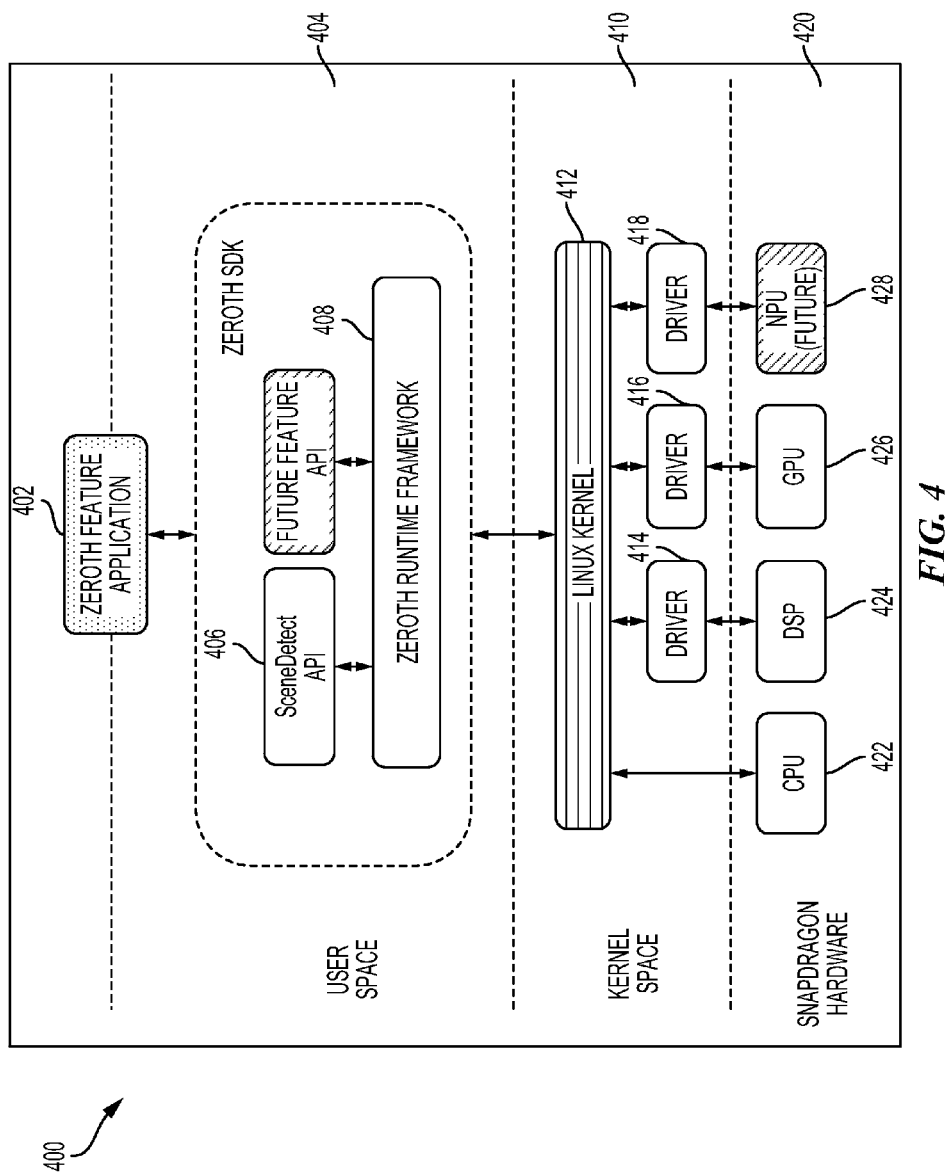
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
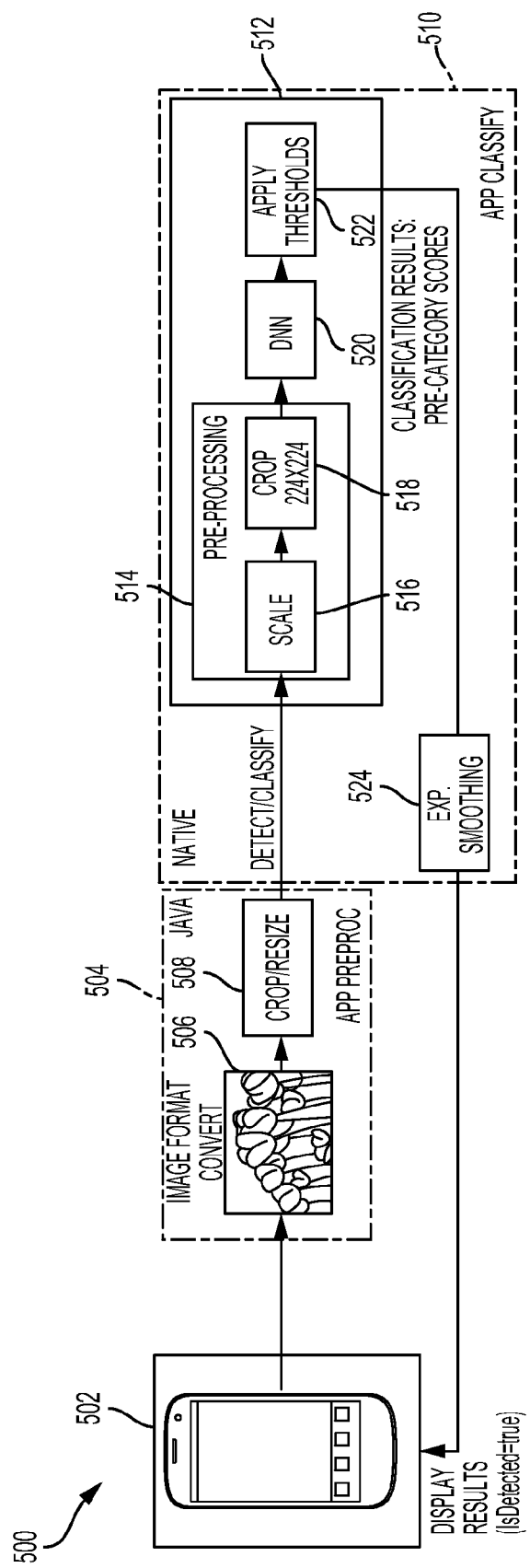
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model, such as a deep convolutional network, is configured for dynamically selecting a reduction factor to be applied to an input image at each layer of the deep convolutional network; and adjusting the deep convolutional network based on the reduction factor selected for each layer. The model includes a dynamically selecting means and/or an adjusting means. In one aspect, the dynamically selecting means and/or an adjusting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the neural network based upon desired one or more functional features of the model, and develop the one or more functional features towards the desired functional features as the determined parameters are further adapted, tuned and updated.

Image Resolution Reduction for a Deep Convolutional Network

As previously discussed, deep convolutional networks (DCNs) may be used for image classification and/or facial recognition for neural networks. For image classification and/or facial recognition, an image resolution is specified for the input image. Furthermore, different image resolutions may be specified for various layers within the DCN.

Figure 6A:
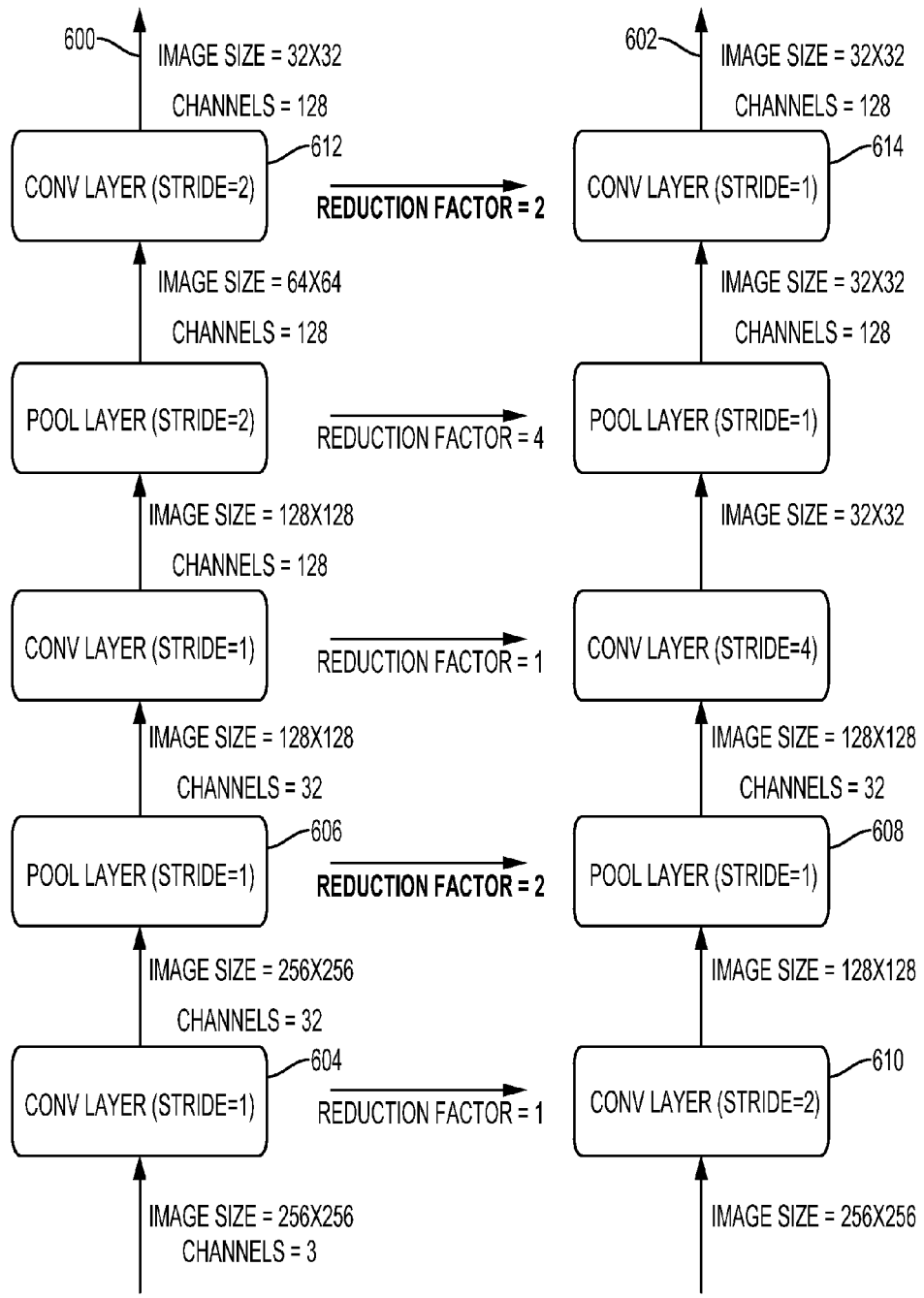
FIGS. 6A and 6B illustrate examples of deep convolutional networks.

FIG. 6A illustrates an example of an original DCN 600 and an adjusted DCN 602. Of course, the layers of a conventional DCN are not limited to the layers shown in FIG. 6A, as more or fewer layers and components may be specified. The adjusted DCN 602 may have a complexity that is greater than or less than the complexity of the original DCN 600.

As shown in FIG. 6A, the original DCN 600 receives an input image having a size of 256 pixels by 256 pixels (256×256) with three channels. The channels represent different colors, such as red, green, and blue. The channels may be more or fewer depending on the colors of the image and/or filters applied to the image. Additionally, as shown in FIG. 6A, the image is input to a first convolutional layer 604 that has a stride of one. The stride refers to the amount of subsampling. That is, the stride is the ratio of a size of the output image to the size of the input image. In this example, the input image has a size of 256×256 and the output image has a size of 256×256. Therefore, the stride is one. That is, subsampling is not performed if the stride is one.

Furthermore, as shown in FIG. 6A the output from the first convolutional layer 604 has thirty-two channels. In most cases, a filter is applied to each channel. Thus, in the example of FIG. 6A, thirty-two filters are applied to the image. Moreover, the output from the first convolutional layer 604 is input to a first pool layer 606. As shown in FIG. 6A, the image size and number of channels output from each layer may change based on the stride factor and/or other factors.

As shown in FIG. 6A, a size of an image input to each layer may differ. Furthermore, each layer may use a specific portion of the input image based on the input image size for performing operations of the specific layer. For example, as shown in FIG. 6A, the image input to the second convolution layer 612 has a size of 64×64. Furthermore, the size of the image output from the second convolution layer 612 is 32×32.

Additionally, FIG. 6A illustrates an adjusted DCN 602 that may be generated by applying reduction factors to layers of the original DCN 600. The reduction factor changes the size of the image that is input to each layer. For example, as shown in FIG. 6A, the image input to the first pool layer 606 has a size of 256×256. Additionally, for the adjusted DCN 602, a reduction factor of two is applied to the first adjusted pool layer 608 such that the image input to the first adjusted pool layer 608 is 128×128. Accordingly, by applying a reduction factor of two to the first adjusted pool layer 608, the stride of the first adjusted convolutional layer 610 is adjusted to two (e.g., output image size/input image size).

Figure 6B:
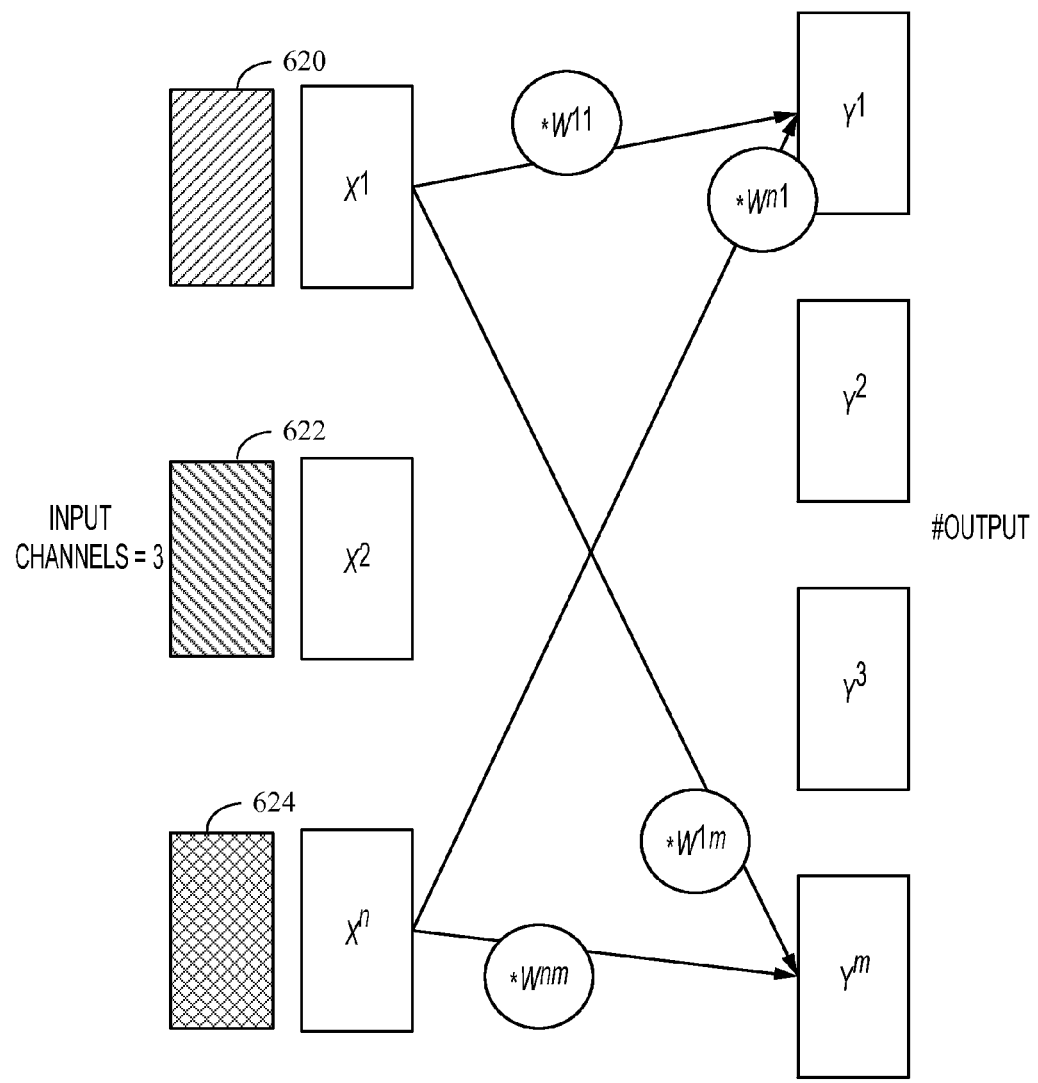

The DCNs of FIGS. 6A and 6B are exemplary DCNs. Of course, the size, such as the number of layers, of the DCN is not limited to the examples. Aspects of the present disclosure are contemplated for DCNs of any size.

In one configuration, the reduction factor of a particular layer adjusts a size of the image that is input to the particular layer. For example, n×n is the input image size of a layer in the original network and r is the reduction factor. In this example, the input image size of this layer in the adjusted DCN is $\lceil n/r \rceil \times \lceil n/r \rceil$, where $\lceil \ \rceil$ represents the ceiling operator.

Because the aforementioned layer expects a lower-resolution image as an input, the complexity of the preceding layer may be reduced by at least a factor of $r^2$. That is, the preceding layer computes $n^2/r^2$ activation values instead of $n^2$ activation values. Thus, as shown in FIG. 6A, because the input to the first adjusted pool layer 608 is reduced by two, the output of the first adjusted convolutional layer 610 is also reduced by two. Thus, the reduction factor adjusts the input to one layer and an output of a preceding layer.

FIG. 6B illustrates an example of a convolution layer. As shown in FIG. 6B, the ith input map $X^i$ is convolved with the weight matrix and added to the jth output map $Y^j$. The weight matrices are also referred to as convolution kernels. Furthermore, the size of the weight matrices (k×k) is referred to as kernel size. As shown in FIG. 6B the convolution layer receives multiple images 620-624 as inputs $x^1$-$x^n$ and outputs multiple image channels $y^1$-$y^m$. Each output image is computed by applying a convolution filter on each of the input images and adding the convolutions.

Despite an increase in computational complexity, conventional DCNs may use higher resolution images to improve the classification of the image. In some cases, the DCN may have a task of determining whether the number three exists within a 32×32 input image with reduced detail. In this example, the size of the image may not improve the classification. In other cases, for images with increased detail, such as a landscape or an image with multiple objects, an increased image size is specified to improve the image classification.

Typically, an image size of 256×256 or higher is used in applications such as object classification or scene classification. In general, higher image resolutions improve classification accuracy while also increasing the computational complexity. That is, the accuracy of the DCN is improved as the size of the input image is increased.

For some devices, such as a mobile device, with limited resources, it may not be desirable to use a large image for classification. Thus, it is desirable to reduce the image resolution of the DCN without increasing a performance impact. That is, in some cases, a DCN may use a lower resolution image without a significant decrease in the performance of the classification. Accordingly, aspects of the present disclosure are directed to adjusting a DCN to operate on lower resolution images while the classification performance of the DCN remains greater than a performance threshold. Furthermore, other aspects of the present disclosure are directed to improving the storage of multiple DCNs in a device.

In one configuration, the image resolution is dynamically reduced at various layers to adjust a complexity of a DCN. Still, in this configuration, a specific image resolution is selected so that the classification performance of the adjusted DCN is greater than a performance threshold. According to aspects of the present disclosure, the reduction factor refers to the ratio by which the input image resolution is reduced. For example, when a reduction factor of two is applied to a 28×28 image, the reduced image has a size of 14×14. As another example, if a reduction factor of three is applied to a 30×30 image, the reduced image has a size of 10×10.

It should be noted that different layers within a DCN may have different reduction factors. That is, the reduction factors are layer specific. In one configuration, an inner-loop and an outer-loop are specified for selecting the reduction factors and adjusting a DCN based on the selected reduction factors.

In one configuration, the outer-loop selects the reduction factors. In this configuration, the outer-loop is used to obtain adjusted DCNs, such as higher complexity DCNs and lower complexity DCNs, based on various reduction factors.

Additionally, in one configuration, the inner-loop uses the reduction factors selected by the outer-loop to adjust a DCN. Specifically, in this configuration, the inner-loop determines an architecture and synaptic weight values of the adjusted DCN. After determining the architecture and synaptic weight values of the adjusted DCN, the inner-loop outputs, to the outer-loop, the difference in classification performance and the computational complexity for the adjusted DCN. Based on the received output, the outer-loop may determine whether the performance of the adjusted DCN is greater than a performance threshold. In this configuration, a reduction factor is selected if the performance of the adjusted DCN is greater than a performance threshold.

In one configuration, the outer-loop randomly selects various reduction factors and invokes the inner-loop for the randomly selected reduction factors. For example, the outer-loop may randomly select a reduction factor of two for a first layer, a reduction factor of three for a second layer, and a reduction factor of four for a third layer. In response to receiving the randomly selected reduction factors, the inner-loop adjusts a DCN model based on the received reduction factors. In some cases, the reduction factors may be fractional.

For each adjusted DCN model, the inner-loop outputs the difference in classification performance between the original image resolution and the reduced image resolution. Additionally, the inner-loop outputs the computational complexity for each adjusted DCN model.

Figure 7:
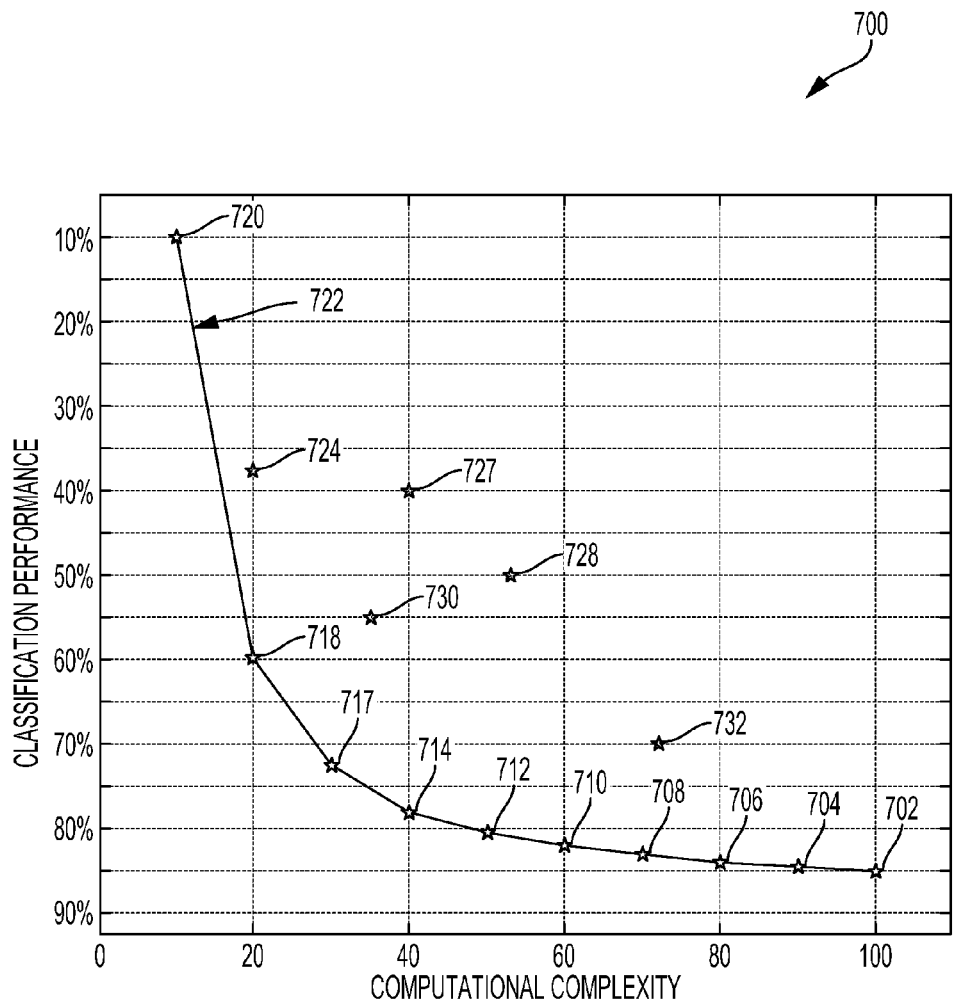
FIG. 7 illustrates an example of a graph plotting computational complexity and classification performance according to an aspect of the present disclosure.

FIG. 7 illustrates an example of a graph 700 generated from the outer-loop based on a computational complexity, such as a number of multiplications performed by a DCN, and a classification performance, such as a classification accuracy, of the DCN. The classification performance may be a metric other than classification accuracy. For example, the classification performance may be calculated based on the classification error. Additionally, the computational complexity may be a metric other than a number of multiplications performed by a DCN. For example, the computational complexity may be the theoretically calculated number of multiplications or an empirically measured run-time.

As shown in FIG. 7, the outer-loop may plot the DCN performance for an original DCN 702 based on an original image resolution. For example, the original DCN 702 may have 85% classification performance and have a computational complexity of 100. According to aspects of the present disclosure, a lower computational complexity is more desirable than a higher computational complexity. Furthermore, in the present example, a higher classification performance is more desirable than a lower classification performance.

Additionally, in the present configuration, the outer-loop may provide the inner-loop with multiple sets of reduction factors. For example, the outer-loop may provide the inner-loop with one hundred sets of randomly selected reduction factors. Each set of reduction factors may include different reduction factors for each layer. Furthermore, in the present configuration, for each set of reduction factors, the inner-loop outputs the computational complexity and classification performance for the DCN having a complexity that is adjusted from a given set of reduction factors.

In the present configuration, based on the outputs of the inner-loop, the outer-loop may plot the DCN performance for each model based on a given set of reduction factors. In the present configuration, the outer-loop may prune the plots by removing plots of models that do not lie on a boundary, such as the Pareto boundary, of the classification performance vs. complexity curve.

As shown in in FIG. 7, a boundary 722 of the classification performance vs. complexity curve is specified based on the DCN performance plot for the original DCN 702. As shown in FIG. 7, plots 704-720 that are within a pre-defined distance of the boundary 722 (for example Pareto boundary) are maintained. Additionally, plots 724-732 that are outside a pre-defined distance of the boundary 722 are ignored. It should be noted that the boundary is not limited to a specific model of the graph, aspects of the present disclosure are directed to determining a boundary for each model. Furthermore, a model may be referred to as a network and/or a DCN.

After pruning the plots that are outside a pre-defined distance of the boundary, the outer-loop may select one or more sets of reduction factors with a performance that is greater than a performance threshold. The performance threshold may be based on the computational complexity and/or the classification performance.

For example, based on FIG. 7, for the original DCN 702, the threshold may be based on the classification performance, such that a reduction factor is selected when the classification performance of the adjusted DCN is greater than or equal to 80%. Thus, based on the example of FIG. 7, the outer-loop may select the reduction factors associated with the first plot 704, second plot 706, third plot 708, fourth plot 710, and fifth plot 712. The selection of the reduction factors based on the output of the inner-loop may be performed offline so that the adjusted DCNs may be selected as desired during on-line operations.

In another configuration, the outer-loop selects the reduction factors based on heuristics. According to an aspect of the present disclosure, the outer-loop selects the reduction factors based on the computational complexity of various layers. For example, some layers have a higher complexity in comparison to other layers. Thus, selecting a low image resolution for an adjusted layer may be detrimental to the system. Therefore, in the present configuration, the outer-loop selects a higher reduction factor for layers with a higher complexity and a lower reduction factor for layer with a lower complexity.

In another configuration, the outer-loop may determine the reduction factor of a particular layer by observing the frequency spectrum of example input images to a particular layer. For example, the network may input multiple images to a DCN model and the outer-loop may observe the frequency spectrum of each image at a given layer in the DCN model. In this configuration, if the image has an increased number of pixels in higher frequencies of the frequency spectrum, reducing the image resolution may not be desirable because image information, such as image contrast, may be lost. That is, by using a lower-resolution image, the higher frequencies in the frequency spectrum are ignored. Thus, reducing the resolution of an image by a reduction factor of r implies that the lower 1 by rth frequencies are retained and the remaining top frequencies are ignored.

Therefore, at each layer, the outer-loop determines whether the image has an increased number of high frequency components or an increased number of low frequency components. More specifically, the energy spectrum of each image is calculated at each layer. The calculated energy spectrum may result in a 2D image.

Figure 8:
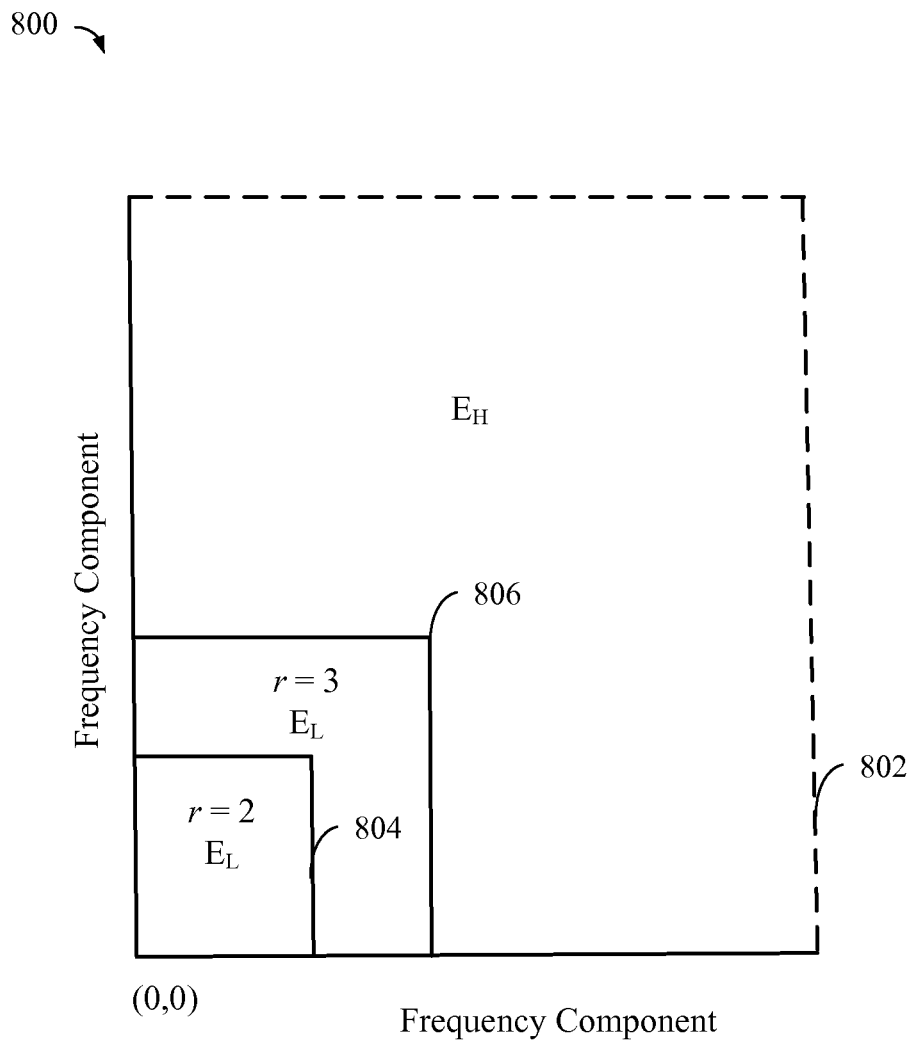
FIG. 8 illustrates an example of a graph for determining energy components of an image according to an aspect of the present disclosure.

FIG. 8 illustrates a graph 800 of an energy spectrum of an image based on an aspect of the present disclosure. As shown in FIG. 8, the x-axis and y-axis of the graph 800 are different frequency components. Values closer to (0,0) are considered low frequency components and values farther from (0,0) are considered high frequency components. In one configuration, the outer-loop averages the energy spectrum across all channels to determine the amount of energy in the low energy spectrum and the amount of energy in the high energy spectrum for the image.

In the example of FIG. 8, the full energy spectrum of an image may be the energy spectrum within an energy boundary 802 of the graph 800. Thus, in this example, if a reduction factor r of two is applied to the image, only the low energy components $E_L$ within a first reduction factor boundary 804 are kept for the image. That is, the high components $E_H$ outside the first reduction factor boundary 804 are ignored for the image.

As another example, if a reduction factor r of three is applied to the image, only the low energy components $E_L$ within a second reduction factor boundary 806 are kept for the image. That is, the high components $E_H$ outside the second reduction factor boundary 806 are ignored for the image.

Thus, for a given reduction factor, the outer-loop computes an energy reduction value based on a fraction of high energy components and a sum of high energy components and low energy components (e.g., $E_H/(E_L+E_H)$). In the present configuration, if the energy reduction value is less than a threshold, then the reduction factor may be desirable because the reduction does not increase the loss of high energy components. Still, if the energy reduction value is greater than a threshold, then the reduction factor may not be desirable because the reduction may increase the loss of high energy components. Thus, according to an aspect of the present disclosure, for each layer, the outer-loop selects a reduction factor r based on whether the energy reduction value for each layer is less than a threshold. The energy components may be referred to as frequency components.

Specifically, when determining the reduction factor r for a layer, the outer-loop selects the highest r based on whether the percentage of energy in the ignored higher frequencies is less than a threshold. The threshold parameter may be controlled to obtain a sequence of DCN models with incremental complexity. That is, higher threshold values result in higher reduction factors, which in turn result in lower complexity models.

Furthermore, after selecting the reduction factor for each layer, the outer-loop transmits the selected reduction factors to the inner-loop to adjust the complexity of a DCN.

In yet another configuration, the outer-loop selects the reduction factors based on both the computational complexity and frequency spectrum.

Furthermore, in one configuration, the inner-loop includes various stages for adjusting the complexity of a DCN model based on the received reduction factors. In one configuration, after receiving the reduction factors, the inner-loop adjusts the weights in each weight-layer, such as the fully-connected layer, the convolutional layer, and the locally-connected layer. The weights are adjusted based on a lower resolution input images. The weights refer to the weights of the synapses that connect a higher layer to a lower layer, dimensions of a weight matrix, and/or values of a weight matrix. Additionally, when adjusting the size of the image, the filters in a layer may be replaced with adjusted-resolution filters that are computed based on the received reduction factor for that layer.

As an example, the reduction factor of a convolutional layer is two, such that the convolutional layer will receive an image having a resolution that is reduced by a factor of two. Because the weights of the given layer are trained on the higher-resolution input image, the weights should be modified to match the lower-resolution input images.

Figure 9:
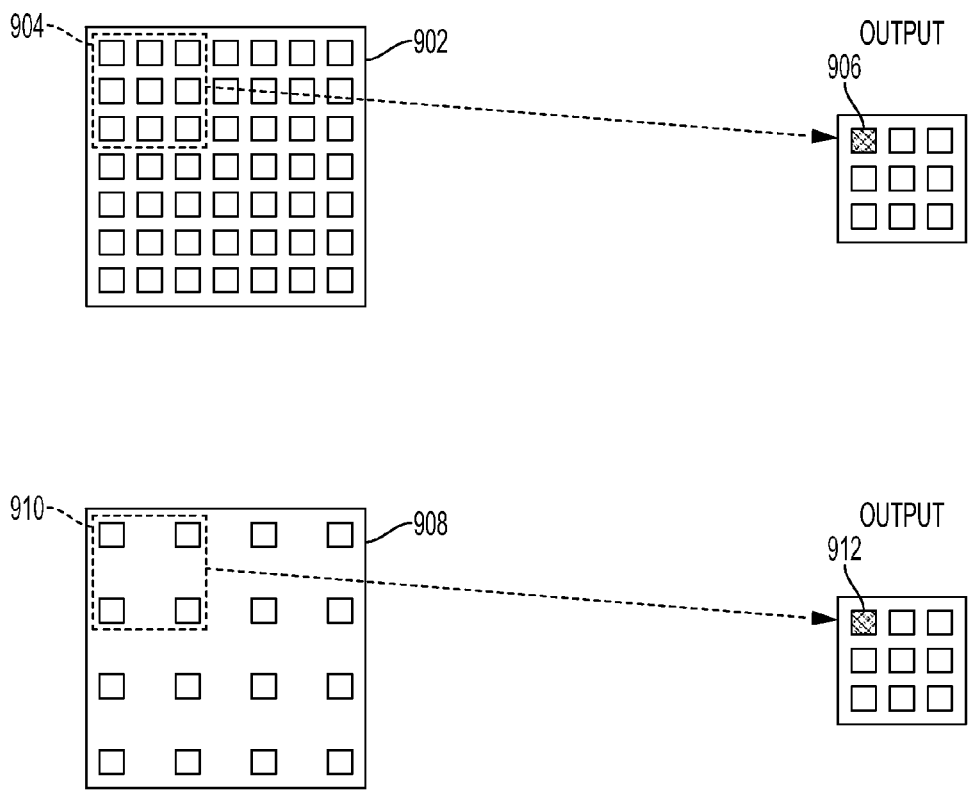
FIG. 9 illustrates an example of image resolution reduction according to aspects of the present disclosure.

FIG. 9 illustrates an example of an image 902 with an original resolution that is input to a layer, such as the convolutional layer, of an original DCN. The example of FIG. 9 may be based on the second convolution layer 612 and the adjusted second convolution layer 614 of FIG. 6A. As shown in FIG. 6A, the input image to the second convolution layer 612 has a size of 64×64. Furthermore, as shown in FIG. 6A, a reduction factor of two may be applied to the second convolution layer, such that the adjusted second convolution layer 614 receives an input image having a size of 32×32.

As shown in FIG. 9, the original image has a size of 7×7. Furthermore, as shown in FIG. 9, a kernel 904 of the original convolutional layer has a size of 3×3 (e.g., k×k). FIG. 9 also illustrates an output 906 of the convolutional layer. The pixel size of FIG. 9 is for illustrative purposes, as the image size and kernel size are intended to map to the aforementioned layers of FIG. 6A.

Based on aspects of the present disclosure, if the reduction factor is r, then the input image size is adjusted from n×n to $\lceil n/r \rceil \times \lceil n/r \rceil$. Furthermore, the kernel size also is adjusted by the same factor, from k×k to $\lceil k/r \rceil \times \lceil k/r \rceil$. That is, the dimensions of a weight matrix may be adjusted (e.g., down sampled) from k×k to $\lceil k/r \rceil \times \lceil k/r \rceil$.

FIG. 9 also illustrates an example of an image 908 with a reduced resolution that is input to a layer, such as the convolutional layer, of a lower-complexity DCN. As shown in FIG. 9, the lower resolution image 908 has a size of 4×4 after the reduction factor of two is applied. Furthermore, as shown in FIG. 9, a modified kernel 910, having a size of 2×2, is applied to the image based on the reduction factor of two. Finally, as shown in FIG. 9, the convolution layer also generates an output 912.

As shown in FIG. 9, for the original DCN, the output 906 is calculated from the nine pixels within the kernel 904. Furthermore, for the adjusted DCN, the output 912 is calculated from the four pixels in the kernel 910. FIG. 9 only illustrates one channel. Of course, aspects of the present disclosure are contemplated for aggregating channels to generate an output.

As shown in FIG. 9, the adjusted DCN calculates an output 912 using fewer pixels in comparison to the original DCN. To accommodate for the lower number of pixels, in one configuration, the weight matrices in the convolution layer are down sampled by the same reduction factor. As an example, if the kernel size of the convolution layer is k×k, the weight matrices are down sampled to $\lceil k/r \rceil \times \lceil k/r \rceil$, where $\lceil \ \rceil$ represents the ceiling operator. The down sampling of the weight matrices may be accomplished using standard methods specified for image processing for image resizing, such as sync interpolation or bilinear interpolation.

In another configuration, training data is used to obtain the weight matrices of the adjusted network. Specifically, the training data may be used to compute the higher-resolution input images that are supposed to be input to the convolution layer of the original DCN. Standard regression tools, such as least squares, may be specified to obtain a linear mapping from the retained pixels in the lower-resolution input images to the missing pixels. The missing pixels refer to pixels that were present in the higher-resolution image and are no longer present in the lower-resolution image. The linear mapping may be specified for the higher-resolution weight matrices to obtain the adjusted resolution weight matrices.

As another example, an original image size may be 28×28 and the filters may be 3×3. Furthermore, in the present example, if a reduction factor of two is applied to the image, such that the image size is 14×14, the filters at a given layer may be adjusted to accommodate the new 14×14 image.

Additionally, some layers do not include weights but may be dependent on the input image resolution. For example, a pooling layer may be used to down sample a received image. Thus, the pooling layer is dependent on the input image resolution. Additionally, the inner-loop may trim connections in the non-weighted layers that are dependent on the input image resolution, such as the pooling layers, to work with lower resolution images. The trimming is performed based on the received reduction factor for that layer. It should be noted that the inner-loop does not modify the other layer types, such as neuron or $r_{norm}$, which are not dependent on the input image resolution.

In one example, the modification of the subsample layers and/or pooling layers may be performed similarly to the modification of the convolution layers. FIG. 9 illustrates an example of a subsample layer and/or pooling layer of an original DCN that receives a high-resolution image and subsample layers and/or pooling layers of a lower-complexity DCN that receive a lower-resolution image.

The example of FIG. 9 may be based on the first pool layer 606 and the adjusted first pool layer 608 of FIG. 6A. As shown in FIG. 6A, the input image to the first pool layer 606 has a size of 256×256. Furthermore, as shown in FIG. 6A, a reduction factor of two may be applied to the first pool layer, such that the adjusted first pool layer 608 receives an input image having a size of 128×128.

FIG. 9 illustrates an example of an image 902 with an original resolution that is input to a layer, such as the pool layer, of an original DCN. As shown in FIG. 9, the original image has a size of 7×7. Furthermore, as shown in FIG. 9, a kernel 904 of the original pool layer has a size of 3×3 (e.g., k×k). FIG. 9 also illustrates an output 906 of the pool layer. The pixel size of FIG. 9 is for illustrative purposes, as the image size and kernel size are intended to map to the aforementioned layers of FIG. 6A.

Based on aspects of the present disclosure, if the reduction factor is r, then the input image size is reduced from n×n to $\lceil n/r \rceil \times \lceil n/r \rceil$. Furthermore, the kernel size also is reduced by the same factor, from k×k to $\lceil k/r \rceil \times \lceil k/r \rceil$. That is, the dimensions of a weight matrix may be adjusted (e.g., down sampled) from k×k to $\lceil k/r \rceil \times \lceil k/r \rceil$.

FIG. 9 also illustrates an example of an image 908 with a reduced resolution that is input to a layer, such as the pool layer, of an adjusted DCN. As shown in FIG. 9, the lower resolution image has a size of 4×4 after the reduction factor of two is applied. Furthermore, as shown in FIG. 9, a modified kernel 910, having a size of 2×2, is applied to the image based on the reduction factor of two. Finally, as shown in FIG. 9, the pool layer also generates an output 912.

As shown in FIG. 9, for the original DCN, the output 906 is calculated from the nine pixels within the kernel 904. Furthermore, for the adjusted DCN, the output 912 is calculated from the four pixels in the kernel 910. FIG. 9 only illustrates one channel. Of course, aspects of the present disclosure are contemplated for aggregating channels to generate an output.

As shown in FIG. 9, the adjusted DCN calculates an output 912 using fewer pixels in comparison to the original DCN. To accommodate for the lower number of pixels, in one configuration, the size of the pooling kernel is reduced from k×k to $\lceil k/r \rceil \times \lceil k/r \rceil$, where r is the reduction factor, such that the type of pooling operation is retained in the adjusted network. That is, if the pool layer in the original DCN performs a specific pool operation, such as average-pooling or max-pooling, then the pool layer in the adjusted DCN also performs the same operation.

Finally, a DCN is adjusted based on the adjusted filters and connections in the layers. After adjusting the complexity of the DCN, the DCN is fine-tuned end-to-end. Fine-tuning refers to continuing the training of the adjusted DCN on the training samples. The number of passes on the training samples for the adjusted DCN may be less than the number of passes of the original DCN. Furthermore, the training samples may include the original training samples and/or new training samples. After fine-tuning the adjusted DCN, the inner-loop may be able to determine a difference in classification performance between the original DCN and the adjusted DCN. It should be noted that a training system, such as back propagation, may be used to fine-tune the DCN.

According to an aspect of the present disclosure, the fine-tuning is applied to specific layers so that the weights of unselected layers remain constant. In one configuration, the convolutional layers are fine-tuned and the fully-connected layers are not fine-tuned.

After determining various adjusted DCNs, it is desirable to improve the storage of the adjusted DCNs. In most cases, the adjusted DCNs are derived from a common base model. Therefore, the adjusted DCNs and the original DCN may be jointly stored so that the overall memory footprint is reduced in comparison to individually storing each DCN, such as the adjusted DCNs and the original DCN.

In one configuration, the original DCN is stored along with one or more adjusted DCNs. Each stored DCN may be used as desired based on specific functionality or performance considerations. Still, memory usage should be considered when storing multiple DCNs.

As previously discussed, the stored DCNs may be derived from a common base model. Thus, joint storage may be specified so that the same value is not stored more than once. Specifically, based on aspects of the present disclosure, the reduction of image resolution is applied to layers for which the input has an image interpretation. Thus, the image reduction may not be applicable for most of the fully-connected layers because the inputs of the fully-connected layers are not dependent on the image resolution. That is, the fully-connected layers may be low on computational complexity but have a high memory footprint. For example, the fully-connected layer may use approximately ninety-percent of the allocated memory.

Therefore, to improve storage, as previously discussed, the fully-connected layers are not included during the fine-tuning stage. That is, the weights of the fully-connected layers may be maintained to be the same as the original DCN. Therefore, the fully-connected layer parameters are the same across all the adjusted DCNs that are derived from a common base model.

Accordingly, in one configuration, the adjusted networks are specified to share the fully-connected layer parameters. That is, the same fully-connected layer parameters are stored for all of the adjusted DCNs and the original DCN. Thus, the DCNs may be jointly stored, reducing the memory footprint. Additionally, convolutional-layers may be stored separately for each DCN (e.g., the adjusted DCNs and the original DCN).

Aspects of the present disclosure may be specified for various devices, such as a mobile device with limited memory, power and computing resources. In some cases, mobile devices may have dynamic resource and latency constraints. For example, in some scenarios, a robot may prefer a fast answer even if the answer is less accurate. In such scenarios, it is helpful to store a sequence of networks with various complexities, so that the application has the ability to choose an appropriate network depending on the situation.

Figure 10:
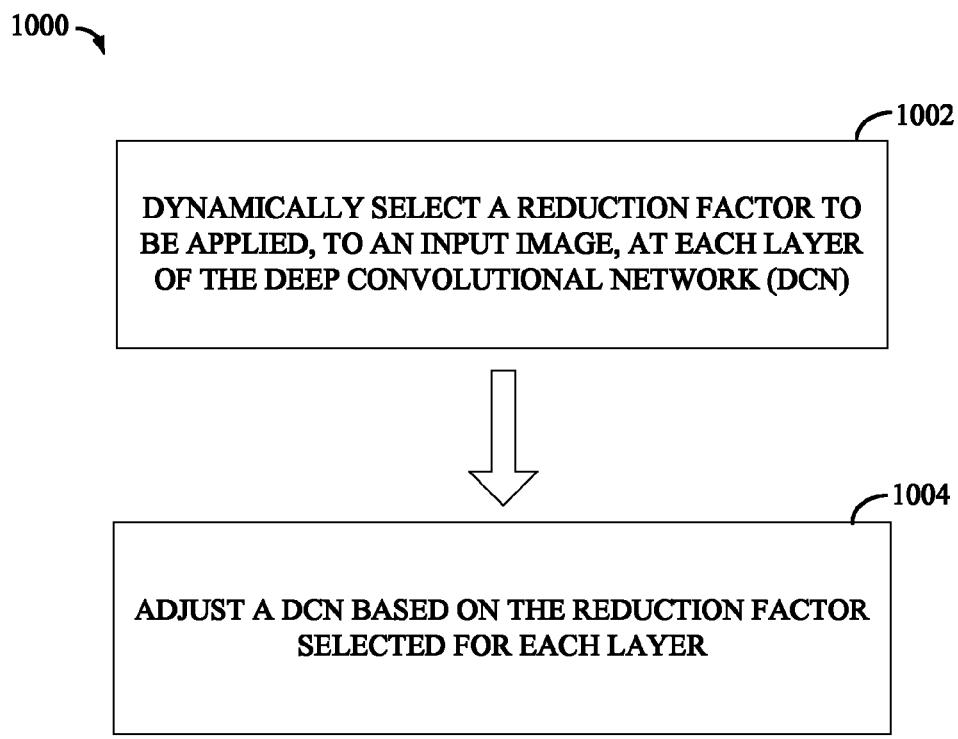
FIGS. 10 and 11 are flow diagrams illustrating methods for reducing image resolution in a deep convolutional network according to aspects of the present disclosure.

FIG. 10 illustrates a method 1000 of reducing image resolution in a deep convolutional network. At block 1002, a network dynamically selects a reduction factor to be applied, to an input image, at each layer of the DCN. At block 1004, the network adjusts a DCN based on the reduction factor selected for each layer.

Figure 11:
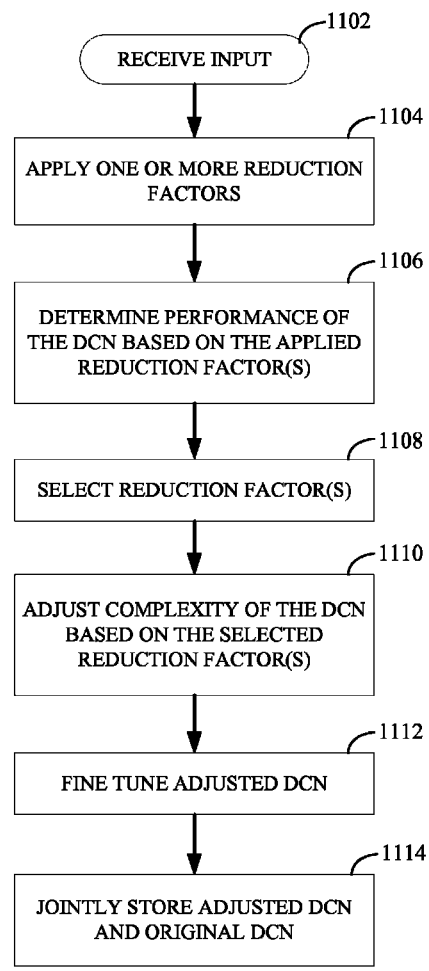

FIG. 11 illustrates a flow diagram for reducing image resolution in a deep convolutional network (DCN). As shown in FIG. 11, at block 1102, a DCN receives an input for classification. As an example, the input may be an image, video, and/or audio file with a specific resolution. For example, the image may have a resolution of 256×256. After receiving the input, at block 1104, the DCN is adjusted by applying one or more reduction factors to the input. The reduction factors are specified to reduce the resolution of the input at each layer of the DCN. As previously discussed, the reduction factor may be layer specific, such that a reduction factor may be different at each layer of the DCN.

Furthermore, at block 1106, the system determines a performance of the DCN based on the applied reduction factor(s). As an example, for each DCN, the difference in classification performance between the original image resolution and the reduced image resolution is determined based on the applied reduction factor(s). Additionally, the computational complexity for each DCN model is also calculated based on the applied reduction factor(s).

After determining the performance of the DCN based on one or more reduction factors, the system selects one or more reduction factors based on the computational complexity and/or the classification performance of the DCN (block 1108). Of course, as previously discussed, the one or more reduction factors are not limited to being selected based on the computational complexity and/or the classification performance of the DCN. In addition to, or alternate from, the computational complexity and/or the classification performance, the reduction factors may be selected based on heuristics, frequency spectrum, and/or other performance measurements.

After selecting the reduction factor(s), the complexity of the DCN is adjusted based on the selected reduction factor(s) (block 1110). For example, the complexity of the DCN may be adjusted by adjusting weights in each weight-layer, such as the fully-connected layer, the convolutional layer, and the locally-connected layer. The weights are adjusted based on lower resolution input images. The weights refer to the weights of the synapses that connect a higher layer to a lower layer, dimensions of a weight matrix, and/or values of a weight matrix.

At block 1112, the adjusted DCN is fine-tuned end-to-end by continuing the training of the adjusted DCN on the training samples. Finally, at block 1114, the adjusted DCN and the original DCN are jointly stored so that the overall memory footprint is reduced in comparison to individually storing each DCN, such as the adjusted DCN and the original DCN.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of reducing image resolution in a deep convolutional network (DCN), comprising:
dynamically selecting, for each layer of a plurality of layers of the DCN, a reduction factor to be applied to an input image; and
adjusting the DCN based at least in part on the reduction factor selected for each layer.

2. The method of claim 1, in which dynamically selecting the reduction factor comprises:
randomly selecting the reduction factor for each layer; and
adjusting each reduction factor based at least in part on performance loss and a level of complexity of the DCN.

3. The method of claim 1, in which dynamically selecting the reduction factor comprises:
selecting the reduction factor, for each layer, based at least in part on computational complexity of each layer of the DCN and/or a fraction of energy in high frequency components of the input image at a given layer; and
adjusting each reduction factor based at least in part on performance loss and a level of complexity of the DCN.

4. The method of claim 1, in which adjusting the DCN further comprises adjusting weights in each layer of the DCN based at least in part on the reduction factor.

5. The method of claim 1, in which adjusting the DCN further comprises trimming synaptic connections in pooling layers of the DCN based at least in part on the selected reduction factor.

6. The method of claim 1, in which adjusting the DCN further comprises fine-tuning the DCN.

7. The method of claim 6, in which the fine-tuning comprises fine-tuning selected layers while maintaining constant weights in at least one other layer.

8. The method of claim 7, in which the selected layers comprise convolutional layers and the least one other layer comprises a fully-connected layer.

9. The method of claim 1, further comprising:
storing one fully-connected layer for both an original DCN and the adjusted DCN; and
storing a first convolutional layer for the original DCN and a second convolutional layer for the adjusted DCN.

10. An apparatus for reducing image resolution in a deep convolutional network (DCN), comprising:
means for dynamically selecting, for each layer of a plurality of layers of the DCN, a reduction factor to be applied to an input image; and
means for adjusting the DCN based at least in part on the reduction factor selected for each layer.

11. The apparatus of claim 10, in which the means for dynamically selecting the reduction factor comprises:
means for randomly selecting the reduction factor for each layer; and
means for adjusting each reduction factor based at least in part on performance loss and a level of complexity of the DCN.

12. The apparatus of claim 10, in which the means for dynamically selecting the reduction factor comprises:
means for selecting the reduction factor, for each layer, based at least in part on computational complexity of each layer of the DCN and/or a fraction of energy in high frequency components of the input image at a given layer; and
means for adjusting each reduction factor based at least in part on performance loss and a level of complexity of the DCN.

13. The apparatus of claim 10, in which the means for adjusting the DCN further comprises means for adjusting weights in each layer of the DCN based at least in part on the reduction factor.

14. The apparatus of claim 10, in which the means for adjusting the DCN further comprises means for trimming synaptic connections in pooling layers of the DCN based at least in part on the selected reduction factor.

15. The apparatus of claim 10, in which the means for adjusting the DCN further comprises means for fine-tuning the DCN.

16. The apparatus of claim 15, in which the means for fine-tuning comprises means for fine-tuning selected layers while maintaining constant weights in at least one other layer.

17. The apparatus of claim 16, in which the selected layers comprise convolutional layers and the least one other layer comprises a fully-connected layer.

18. The apparatus of claim 10, further comprising:
means for storing one fully-connected layer for both an original DCN and the adjusted DCN; and
means for storing a first convolutional layer for the original DCN and a second convolutional layer for the adjusted DCN.

19. An apparatus for reducing image resolution in a deep convolutional network (DCN), comprising:
a memory unit; and
at least one processor coupled to the memory unit, the at least one processor configured:
to dynamically select, for each layer of a plurality of layers of the DCN, a reduction factor to be applied to an input image; and
to adjust the DCN based at least in part on the reduction factor selected for each layer.

20. The apparatus of claim 19, in which the at least one processor is further configured:
to randomly select the reduction factor for each layer; and
to adjust each reduction factor based at least in part on performance loss and a level of complexity of the DCN.

21. The apparatus of claim 19, in which the at least one processor is further configured:
to select the reduction factor, for each layer, based at least in part on computational complexity of each layer of the DCN and/or a fraction of energy in high frequency components of the input image at a given layer; and
to adjust each reduction factor based at least in part on performance loss and a level of complexity of the DCN.

22. The apparatus of claim 19, in which the at least one processor is further configured to adjust weights in each layer of the DCN based at least in part on the reduction factor.

23. The apparatus of claim 19, in which the at least one processor is further configured to trim synaptic connections in pooling layers of the DCN based at least in part on the selected reduction factor.

24. The apparatus of claim 19, in which the at least one processor is further configured to fine-tune the DCN.

25. The apparatus of claim 24, in which the at least one processor is further configured to fine-tune selected layers while maintaining constant weights in at least one other layer.

26. The apparatus of claim 25, in which the selected layers comprise convolutional layers and the least one other layer comprises a fully-connected layer.

27. The apparatus of claim 19, in which the at least one processor is further configured:
to store one fully-connected layer for both an original DCN and the adjusted DCN; and
to store a first convolutional layer for the original DCN and a second convolutional layer for the adjusted DCN.

28. A non-transitory computer-readable medium for reducing image resolution in a deep convolutional network (DCN), the non-transitory computer-readable medium having program code recorded thereon, the program code being executed by a processor and comprising:
program code to dynamically select, for each layer of a plurality of layers of the DCN, a reduction factor to be applied to an input image; and
program code to adjust the DCN based at least in part on the reduction factor selected for each layer.

29. The computer-readable medium of claim 28, further comprising:
program code to randomly select the reduction factor for each layer; and
program code to adjust each reduction factor based at least in part on performance loss and a level of complexity of the DCN.

30. The computer-readable medium of claim 28, further comprising:
program code to select the reduction factor, for each layer, based at least in part on computational complexity of each layer of the DCN and/or a fraction of energy in high frequency components of the input image at a given layer; and
program code to adjust each reduction factor based at least in part on performance loss and a level of complexity of the DCN.

31. The computer-readable medium of claim 28, further comprising program code to adjust weights in each layer of the DCN based at least in part on the reduction factor.

32. The computer-readable medium of claim 28, further comprising program code to trim synaptic connections in pooling layers of the DCN based at least in part on the selected reduction factor.

33. The computer-readable medium of claim 28, further comprising program code to fine-tune the DCN.

34. The computer-readable medium of claim 33, further comprising program code to fine-tune selected layers while maintaining constant weights in at least one other layer.

35. The computer-readable medium of claim 34, in which the selected layers comprise convolutional layers and the least one other layer comprises a fully-connected layer.

36. The computer-readable medium of claim 28, further comprising:
- program code to store one fully-connected layer for both an original DCN and the adjusted DCN; and
- program code to store a first convolutional layer for the original DCN and a second convolutional layer for the adjusted DCN.

* * * * *